United States Patent
Pearl et al.

(10) Patent No.: US 10,768,770 B2
(45) Date of Patent: Sep. 8, 2020

(54) SYSTEM AND METHODS FOR CONFIGURING EVENT-BASED AUTOMATION IN CLOUD-BASED COLLABORATION PLATFORMS

(71) Applicant: Box, Inc., Redwood City, CA (US)

(72) Inventors: Annie Pearl, San Francisco, CA (US); Matthew Taro Duvall, San Francisco, CA (US); Joy Ebertz, San Jose, CA (US); Victor Valdez, Los Altos, CA (US); Steven Cipolla, Los Altos, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 16/410,713

(22) Filed: May 13, 2019

(65) Prior Publication Data

US 2019/0265821 A1     Aug. 29, 2019

Related U.S. Application Data

(63) Continuation of application No. 14/075,849, filed on Nov. 8, 2013, now Pat. No. 10,509,527.

(Continued)

(51) Int. Cl.
| | |
|---|---|
| *G06F 3/00* | (2006.01) |
| *G06F 3/048* | (2013.01) |
| *G06F 8/34* | (2018.01) |
| *G06Q 10/10* | (2012.01) |
| *G06F 9/451* | (2018.01) |
| *H04L 29/06* | (2006.01) |
| *H04L 29/08* | (2006.01) |
| *G06F 16/23* | (2019.01) |

(52) U.S. Cl.
CPC ............... *G06F 3/048* (2013.01); *G06F 8/34* (2013.01); *G06Q 10/10* (2013.01); *G06F 9/453* (2018.02); *G06F 16/2358* (2019.01); *H04L 65/4015* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 6,057,841 A * | 5/2000 | Thurlow | G06F 17/279 |
| | | | 706/45 |
| 2012/0192086 A1* | 7/2012 | Ghods | G06Q 10/10 |
| | | | 715/753 |
| 2013/0124638 A1* | 5/2013 | Barreto | G06F 15/16 |
| | | | 709/205 |

OTHER PUBLICATIONS

Christian Wolter et al., Collaborative Workflow Management for eGovernment, Sep. 1, 2007, IEEE Computer Society, pp. 845-849 (Year: 2007).*

(Continued)

*Primary Examiner* — Tam T Tran
(74) *Attorney, Agent, or Firm* — Sheridan Ross P.C.

(57) ABSTRACT

Scalable architectures, systems, and services are provided herein for generating jobs by applying user-specified rules to events in an action log framework (ALF) stream is disclosed. More specifically, collaboration environments can include features or mechanisms that allow end-users or collaborators to perform a variety of actions such as, for example, file uploads and previews, or collaboration operations such as, for example, task assignment and comments. These actions can be captured or logged by an action log framework and, as described herein, automatically translated into one or more jobs by applying customizable user-specified rules.

20 Claims, 16 Drawing Sheets

Related U.S. Application Data

(60) Provisional application No. 61/877,917, filed on Sep. 13, 2013.

(56) References Cited

OTHER PUBLICATIONS

Jie Meng, Achieving Dynamic Inter-ORganizational Workflow Management by Intergrating Business Processes Events and Rules, Jan. 1, 2002, IEEE Computer Society, pp. 1-10 (Year: 2002).*

* cited by examiner

Marketing collateral approval process

Approval process

Automation name: First Automation

Search Users 🔍　　　　　　　Enterprise Settings ⚙

▼ Step 1

If this happens: | File ▼ | Uploaded ▼

In this folder
Aaron Levie/Margaret's sewing shop (1)

Then do this: | Assign a task ▼

To this person:
| Andy Kiang × |

▼ Step 2

If this happens: | Task ▼ | Completed ▼

In this folder
User 10/Orientation Materials

Then do this: | Assign a task ▼

To this person:
Enter names or email addresses

+ Add Another Step

*FIG. 8C*

Policies

Add New Policy

Policy name: _____

Policy type: ● Upload  ○ Download  ○ Sharing

If a document contains:
- ☐ Social Security Number
- ☐ Credit Card Number
- ☐ Custom words or numbers Then take the actions:
- ☐ Move the file to quarantine
- ☐ Notify the email addresses:

[Start Policy Now]  [Cancel]

+ Create Policy

- High Dowload Activity
- Social Security Number
- Project Street Fighter
- IBM
- Credit Card Information
- Credit Card Information
- SSN
- CC
- Credit card
- Credit Card Violation
- Credit Card Policy
- Pfizer policy

*FIG. 9B*

□ Admin Console | Need Help? Call Acme Co at 800-555-1212

Policies

+ Create Policy

High Dowload Activity
Social Security Number
Project Street Fighter
IBM
Credit Card Information
Credit Card Information
SSN
CC
Credit card
Credit Card Violation
Credit Card Policy
Pfizer policy

Add New Policy

Policy name: _____

Policy type: ○ Upload ● Download ○ Sharing

If a user download activity is:
○ Low (6 per hour)
○ Medium (8 per hour)
○ High (11 per hour)

Then take the actions: ☐ Notify the email addresses: _____

[Start Policy Now] [Cancel]

SYSTEM AND METHODS FOR CONFIGURING EVENT-BASED AUTOMATION IN CLOUD-BASED COLLABORATION PLATFORMS

CROSS-REFERENCE TO RELATED APPLICATIONS

This application is a continuation of U.S. application Ser. No. 14/075,849, entitled "SYSTEMS AND METHODS FOR CONFIGURING EVENT-BASED AUTOMATION IN CLOUD-BASED COLLABORATION", filed Nov. 8, 2013, which claims priority to U.S. Application No. 61/877,917, entitled "SYSTEMS AND METHODS FOR CONFIGURING EVENT-BASED AUTOMATION IN CLOUD-BASED COLLABORATION PLATFORMS", filed Sep. 13, 2013, the contents of which are expressly incorporated by reference herein. This application is related to co-owned U.S. patent application Ser. No. 14/026,674, entitled "CONFIGURABLE EVENT-BASED AUTOMATION ARCHITECTURE FOR CLOUD-BASED COLLABORATION PLATFORMS," filed Sep. 13, 2013, the contents of which are expressly incorporated by reference herein.

BACKGROUND

As electronic and digital content use in enterprise settings and/or other organizational settings has become the preferred mechanism for project, task, and work flow management, so has the need for streamlined collaboration and sharing of digital content and documents. In such collaboration environments, multiple users share, access, and otherwise perform actions or tasks on content and files in shared workspaces. Because multiple users share, access, and otherwise perform actions or tasks on content and files in shared workspaces, workflow management can become a burdensome task.

BRIEF DESCRIPTION OF THE DRAWINGS

FIGS. 8A-8C depict example user interfaces illustrating an administrator console automation view of a graphical user interface for configuration event-based automation in cloud-based collaboration platforms.

FIGS. 9A-9D depict example user interfaces illustrating an administrator console policy view of a graphical user interface for configuration event-based automation in cloud-based collaboration platforms.

FIGS. 10A-10B depict example user interface illustrating an administrator console content manager view of a graphical user interface for configuration event-based automation in cloud-based collaboration platforms.

DETAILED DESCRIPTION

Figure 1:
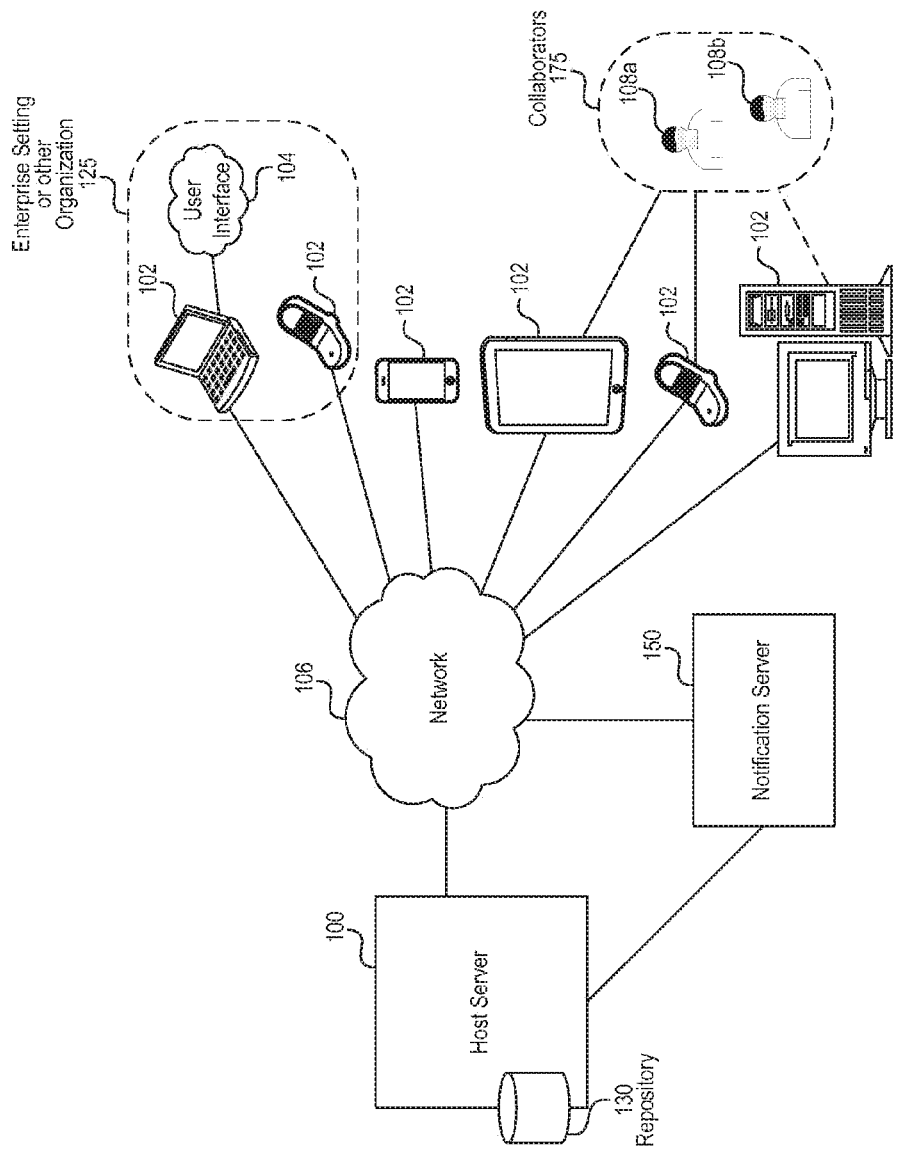
FIG. 1 illustrates a diagram of an example system having a host server of a cloud service and/or cloud storage accounts in a configurable event-based automation architecture.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Systems, methods, and graphical user interfaces for configuring event-based automation in a cloud-based collaboration platform or environments are described herein. More specifically, the techniques described herein facilitate rule (e.g., policy and/or automation) generation in order to provide enhanced security and improved workflow management. For example, a rules engine performs event-based automation and allows administrators (and/or end-users) the ability to configure rules that automatically identify events in the cloud-based collaborative environment and execute user-defined or specified action.

In one embodiment, a graphical user interface (GUI) is provided allowing administrators to identify events occurring in the cloud-based collaborative environment that raise potential security concerns. The GUI also facilities generation or creation of rules that direct the cloud-based environment to execute and/or otherwise trigger user-defined actions upon identification of the events.

In one embodiment, a GUI is provided allowing administrators to increase user engagement by facilitating rule generation for workflow management purposes. For example, files or documents are fundamentally encircled by review and approval processes. The GUI allows administrators to, for example, create tasks upon upload event (e.g., upload of a document). Accordingly, the techniques discussed herein provide enhanced workflow management through configurable rule-based automations.

Embodiments of the present disclosure describe an architecture including systems and methods for configurable event-based automation in a cloud-based collaboration platform or environment.

FIG. 1 illustrates an example diagram of a system having a host server 100 of a cloud service and/or cloud storage accounts in a configurable event-based automation architecture.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination or variation of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
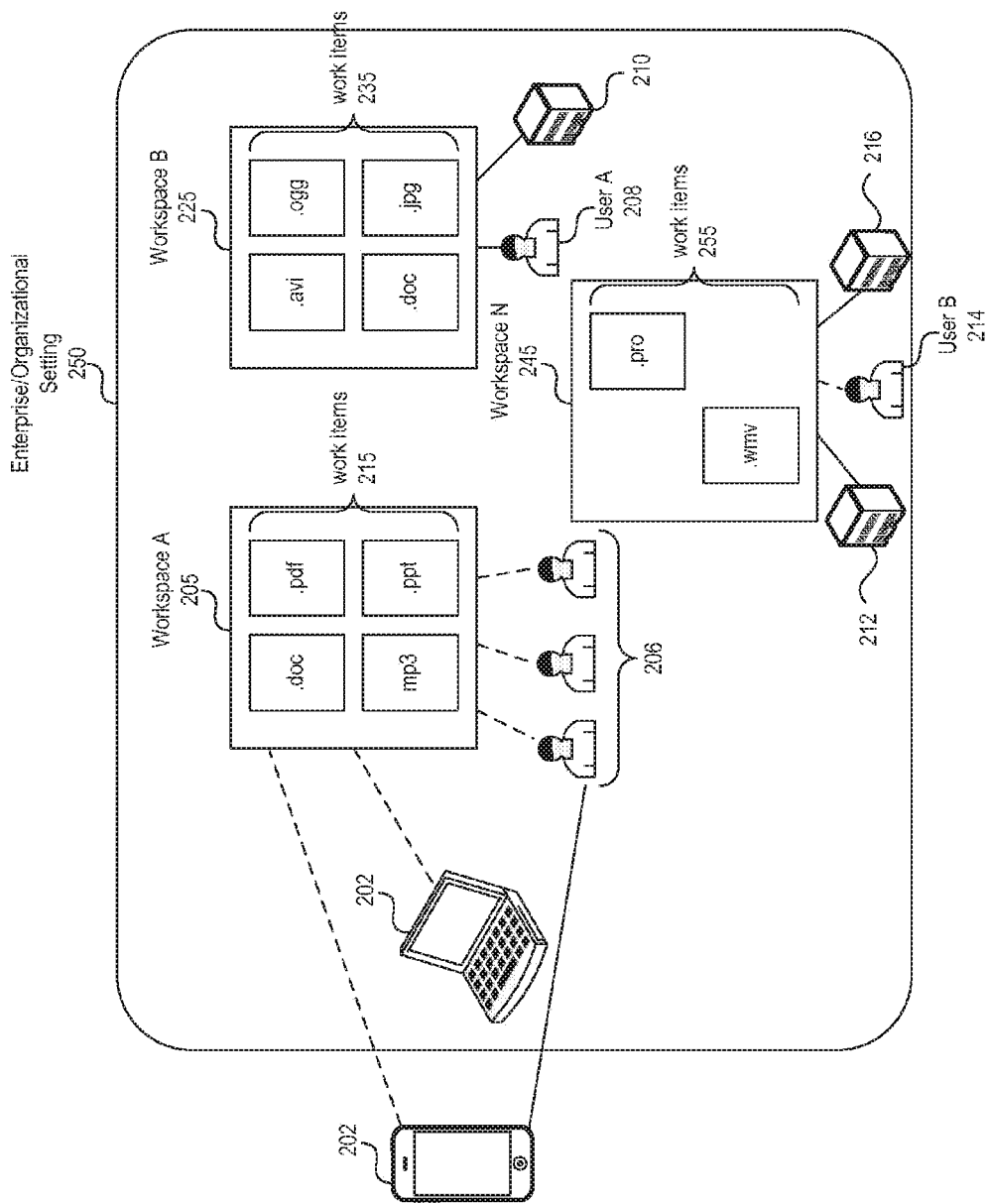
FIG. 2 depicts a diagram of an example web-based or online collaboration platform deployed in an enterprise or other organizational setting for organizing work items and workspaces, as one example of a hosted cloud service and/or cloud storage accounts in a configurable event-based automation architecture.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, client devices 102 communicate with the host server 100 and/or people search engine 150 over network 106. In general, network 106, over which the client devices 102, the host server 100, and/or people search engine 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, !MT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, actions performed on work items or other activities that occur in a workspace can be detected in real time or in near real time. The host server can generate notifications or notification events for one or more of the plurality of activities and select one or more recipients for each notification. Various mechanisms or external messaging applications can then be used to notify users or collaborators, including through the web interface to access the collaboration platform, via email, and/or SMS, for example.

In one embodiment, the host server can comprise a distributed system including both front-end and back-end components (systems). Although not shown, the host server can include an action log, an event dispatcher, one or more processors, one or more databases, and one or more real time clients. Together these components are generally referred to herein as an "action log framework" (ALF). Components of the ALF may reside in the front-end systems, the back-end systems, or a combination thereof.

In one embodiment, the host server can provide for and/or otherwise facilitate configuration of user-defined rules for workflow automation. For example, administrators (or authorized end-users) can create if-then statements that essentially identify standard events in the events application program interface (API) and actions that the collaboration platform should execute when the event is triggered. As discussed, the events can be any event in the APL In one embodiment, an administrator (or authorized end-user) can also create additional events and/or actions. The actions can include, but are not limited to: Email alert, Delete, Quarantine, Create and assign a task, Review, Approve, Decline, Update a field, Move to a folder, Rename, Convert a file, Block an action, Send to, Copy a file (to a folder), Share a link (with permissions x to email address), Run a search, OCR a file, and/or Make a custom link.

In one embodiment, the user-defined rules can include pre-configured support for data loss prevention (DLP). Additionally, pre-configured support or the ability to allow administrators to set up security alerts for: download threshold activity, domain watch list for sharing, and automation support for approval processes is can also be supported.

In one embodiment, the system can be automatically updated to support new events and actions. Rules can be complex including numerous if-conditions to trigger one or more else-actions.

FIG. 2 depicts a diagram of a web-based or online collaboration platform deployed in an enterprise or other organizational setting 250 for organizing work items 215, 235, 255 and workspaces 205, 225, 245, as one example of a hosted cloud file sharing, collaboration service and/or cloud storage service in a configurable event-based automation architecture.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A-N) may be created to support different projects or a variety of work flows. Each workspace may have its own associate work items. For example, work space A 205 may be associated with work items 215, work space B 225 may be associated with work items 235, and work space N may be associated with work items 255. The work items 215, 235, and 255 may be unique to each work space but need not be. For example, a particular word document may be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 may be associated with departments 212 and 216 and users shown as example user B 214.

Each user associated with a work space may generally access the work items associated with the work space. The level of access may depend on permissions associated with the specific work space, and/or with a specific work item. Permissions may be set for the work space or set individually on a per work item basis. For example, the creator of a work space (e.g., one of user A 208 who creates work space B) may set one permission setting applicable to all work items 235 for other associated users and/or users associated with the affiliate department 210, for example. Creator user A 208 may also set different permission settings for each work item, which may be the same for different users, or varying for different users.

In each work space A, B, . . . , N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

In some embodiments, items or content (content items) downloaded or edited in accordance with the techniques described in the present disclosure can cause notifications to be generated. Such notifications can be sent to relevant users to notify them of actions surrounding a download, an edit, a change, a modification, a new file, a conflicting version, an upload of an edited or modified file. Additionally, as discussed above, actions performed on the content items can be maintained by an ALF system.

In one embodiment, in a user interface of the web-based collaboration platform where notifications are presented, users can, via the user interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
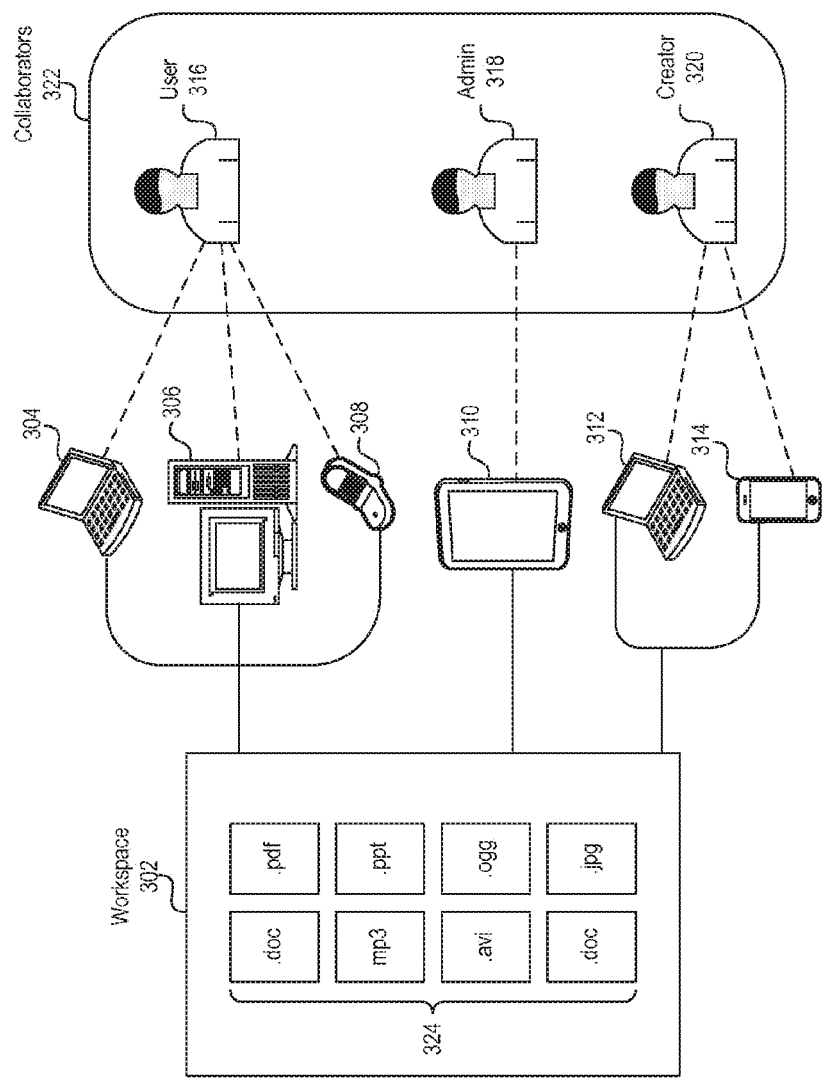
FIG. 3 depicts a diagram of an example workspace in a cloud-based, online or web-based collaboration environment accessible by multiple collaborators through various devices authorized to access the work space.

FIG. 3 depicts an example diagram of a workspace 302 in an online or web-based collaboration environment accessible by multiple collaborators 322 through various devices authorized to access the work space.

Each of users 316, 318, and 320 may individually use multiple different devices to access and/or manipulate work items 324 (e.g., content items) in the work space 302 with which they are associated with. For example users 316, 318, 320 may be collaborators on a project to which work items 324 are relevant. Since the work items 324 are hosted by the collaboration environment (e.g., a cloud-based environment), each user may access the work items 324 anytime, and from any physical location using any device (e.g., including devices they own or any shared/public/loaner device).

Work items to be edited or viewed may be accessed from the workspace 302 in accordance with the platform and/or application independent mechanisms. Users may also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download, access, read, write, edit, or upload related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Work items hosted by a collaboration environment (e.g., a cloud-based collaboration environment) can be accessed by users (e.g., users 316, 318, and 320) via multiple different devices (e.g., devices 304-314) for viewing, editing, processing or performing other manipulations on work items. The devices can include applications for accessing a server hosting a cloud-based platform or service or other backend web services (hereinafter "cloud-based collaboration platform application") and applications for viewing, editing, processing, or performing other manipulations on work items. The communication between such applications are generally facilitated by a communication mechanism of the OS. For example, in Android OS, the communication mechanism is based on "Intents". As previously described, the underlying communication mechanism are generally insecure, and any data passed between applications are visible to all other application on a device.

Figure 4:
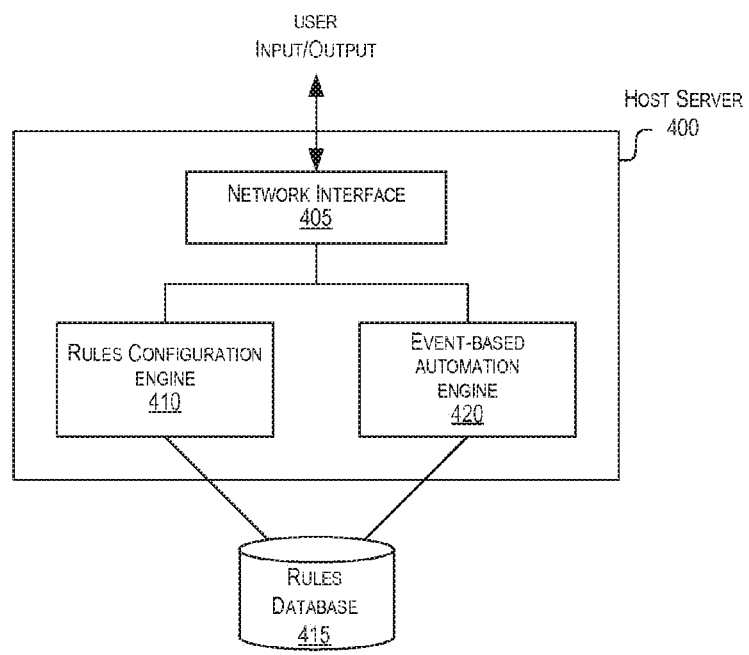
FIG. 4 depicts a block diagram illustrating an example of components in a host server for cloud-based services and storage accounts, the host server including a rules configuration engine facilitating configuration of rules (automations and/or policies) in a cloud-based collaboration environment.

FIG. 4 depicts a block diagram illustrating an example of components in a host server 400 for cloud-based services and storage accounts, the host server 400 including a rules configuration engine 410 facilitating configuration of rules (automations and/or policies) in a cloud-based collaboration environment. The host server 400 can be host server 100 of FIG. 1, although alternative configurations are possible.

The host server 400 of the cloud-based collaboration environment can generally be a cloud-based service. The host server 400 can include, for example, a network interface 405, a rules configuration engine 410, a rules database 415, and an event-based automation engine 420. Additional or less components/modules/engines can be included in the host server 400 and each illustrated component. Further, although illustrated as included as part of the host server 400, the components/modules/engines can be physically and/or functionally distributed.

The network interface 405 can be a networking module that enables the host server 400 to mediate data in a network with an entity that is external to the host server 400, through any known and/or convenient communications protocol supported by the host and the external entity. The network interface 405 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater. Additionally, although not illustrated in the example of FIG. 4, in the case of distributed components, each component can include a network interface.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 400 includes the rules configuration engine 410 which can facilitate interaction with the users/administrators to generate rules. An example of the components in a rules configuration engine 410 is shown and discussed in greater detail with reference to FIG. 5.

One embodiment of the host server 400 includes the event-based automation engine 420 which can monitor events such as, for example, ALF events, and utilize and/or otherwise automatically apply the user-defined rules generated by the rules configuration engine 410 to the events in the cloud-based collaboration environment. The event-based automation engine 420 is discussed in greater detail in co-pending U.S. patent application, entitled "CONFIGURABLE EVENT-BASED AUTOMATION ARCHITECTURE FOR CLOUD-BASED COLLABORATION PLATFORMS," which has been concurrently filed on even date herewith.

Figure 5:
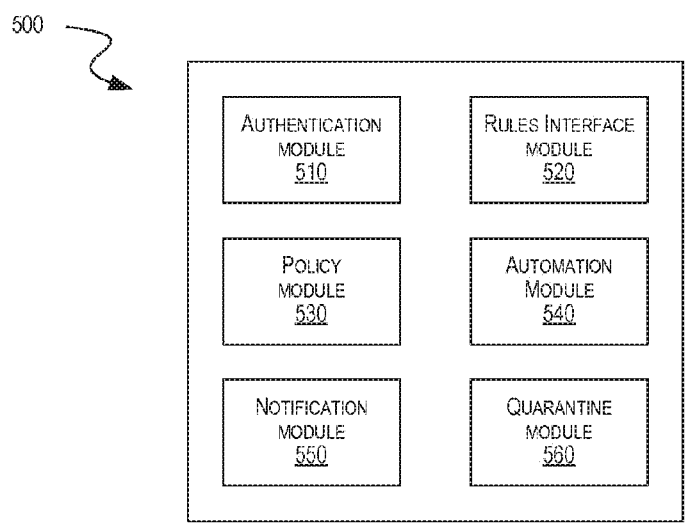
FIG. 5 depicts a block diagram illustrating an example rules configuration engine.

FIG. 5 depicts a block diagram illustrating an example rules configuration engine 500. The rules configuration engine 500 can be, for example, the rules configuration engine 410 of FIG. 4, although alternative configurations are possible.

The rules configuration engine 500 can include, for example, an authentication module 510, a rules interface module 520, a policy module 530, an automation module 540, a notification module 550, and a quarantine module 560. Additional or less components/modules/engines can be included in rules configuration engine 500 and/or in each illustrated component/module.

One embodiment of the rules configuration engine 500 includes the authentication module 510 which can authenticate administrators (or end-users) for rule configuration (i.e., to set a rule in the system). In one embodiment, the authentication can, for example, include additional credentials, e.g., username and password combination. Alternatively or additionally, the authentication module 510 may compare the current user to a list of authorized administrators or end-users. Authentication in other manners is also possible.

One embodiment of the rules configuration engine 500 includes the rules interface module 520 which can receive, parse, and or otherwise process and distribute appropriate information received over the network to the other modules or received from the other modules over the network. The rules configuration engine 500 also provides graphical user interfaces to administrators and processes responses to allow administrators to traverse the various interfaces and/or allow the administrators to enter information into the GUI fields that can be used by the policy module 530 and/or the automation module 540 to generate rules (e.g., automations and/or policies).

One embodiment of the rules configuration engine 500 includes the policy module 530 which can facilitate generation of policies responsive to administer input. For example, administrators can satisfy security concerns with DLP and alerts for abnormal activity by creating polices to govern end-user activity within the collaborative environment.

One embodiment of the rules configuration engine 500 includes the automation module 540 which can perform the automation functions responsive to automation information received by the rules configuration engine 500 via a GUI. In one embodiment, the automation can satisfy various business process use case by allowing administrators to set up automated processes when events occur within the collaboration environment. For example, in one embodiment, administrators can set up automation steps using the following events: Upload, Move, Copy, Assign a task, Task marked as complete, Actions, Move, Copy, Assign a task, etc. Additional events can also be used as the list above is not limiting nor exhaustive.

One embodiment of the rules configuration engine 500 includes the reporting and notification module 550 which can perform the various logging and notification functions. For example, the various information can be logged and available via a reports tab on a GUI.

In one embodiment, actions taken around automation can be logged. For example, when an administrator visits the Reports graphical interface and selects "Automation" and a date range, the administrator will be able to pull a report for all activity having to do with automation during the specified time period that includes the following pieces of information: Date/time the action took place, User who took the action, Action (e.g., Created new (automation), Edited (automation), Deleted (automation)), Item/name, Folder, additional Details (e.g., automation name that was entered into the 'Automation Name' field that the corresponding action was taken on), etc.

In one embodiment, actions take around policies can be logged. For example, when an administrator visits the Reports graphical interface and selects "Policy" and a date range, the administrator will be able to pull a report for all activity having to do with policy during the specified time period that includes the following pieces of information:

Date/time the action took place, User who took the action, Action (e.g., Created new (policy), Edited (policy), Deleted (policy), etc.), Item/name, Folder, additional Details (e.g., the policy name that was entered into the 'Policy Name' field that the corresponding action was taken on), etc.

In one embodiment, actions taken in quarantine can be logged. For example, when an admin visits the Reports graphical interface and selects "Quarantine" and a date range, the administrator will be able to pull a report for all activity having to do with quarantine during the specified time period that includes the following pieces of information: Date/time the action took place, User who took the action, Action (e.g., Previewed, Deleted, Restored, Moved to, Item/name (e.g., Name of the file version that an action was taken on), Folder, Quarantine (if it was sent to quarantine based on policy violation), [Folder name] (if it was restored back to the original folder location it was uploaded to, additional details (e.g., if the action was "item moved to quarantine", then the details would state which policy was triggered). Additionally, if the policy that was triggered was via a 3rd party DLP provider, it would list out the corresponding string sent in the API call by the 3rd party DLP provider for policy violation. If no policy violation is sent via the API for a 3rd party DLP provider, the details will state "3rd party DLP vendor" or the vendors name if that is known. If the action was "previewed" or "deleted, then the details would state the policy that was triggered when the item got moved to quarantine. If the action was "restored," then the details would state the policy that was triggered when the item got moved to quarantine AND would state if it was marked as a "false positive."

In one embodiment, abnormal activity actions can be logged. For example, when an admin visits the Reports graphical interface and selects "Abnormal Activity" and a date range, they will be able to pull a report for all abnormal activity that was flagged during the specified time period that includes the following pieces of information: Date/time the abnormal activity occurred, User who performed the abnormal activity, Action, Abnormal activity, Item/name, If the abnormal activity was a sharing violation to an email on the domain watchlist, the file that was shared would be listed, Folder, If the abnormal activity was a sharing violation to an email on the domain watchlist, the folder that the file that was shared was contained in would be listed, If a whole folder was shared, then the Item/Name and Contained in Folder would both list the name of the folder that was shared, additional details about the abnormal activity policy that was violated (e.g., Download [# files] in [time period], Shared with [domain on watchlist], If shared with multiple domains, there would be separate entries for each abnormal activity violation, etc.).

One embodiment of the rules configuration engine 500 includes the quarantine module 560 which can automatically perform a quarantine function (e.g., quarantine a file). For example, when a file violates an upload policy set up in the policy center, the file version will automatically be moved to a quarantine folder where it will only accessible by an administrator. An administrator can view all versions of files that have been quarantined and perform the following actions on them: Preview, Delete, Restore (e.g., mark as false/positive—can be used to prevent future false positive).

In one embodiment, when a file version has been quarantined by the quarantine module 560, that version if of the file can be replaced with a dummy version.

Figure 6:
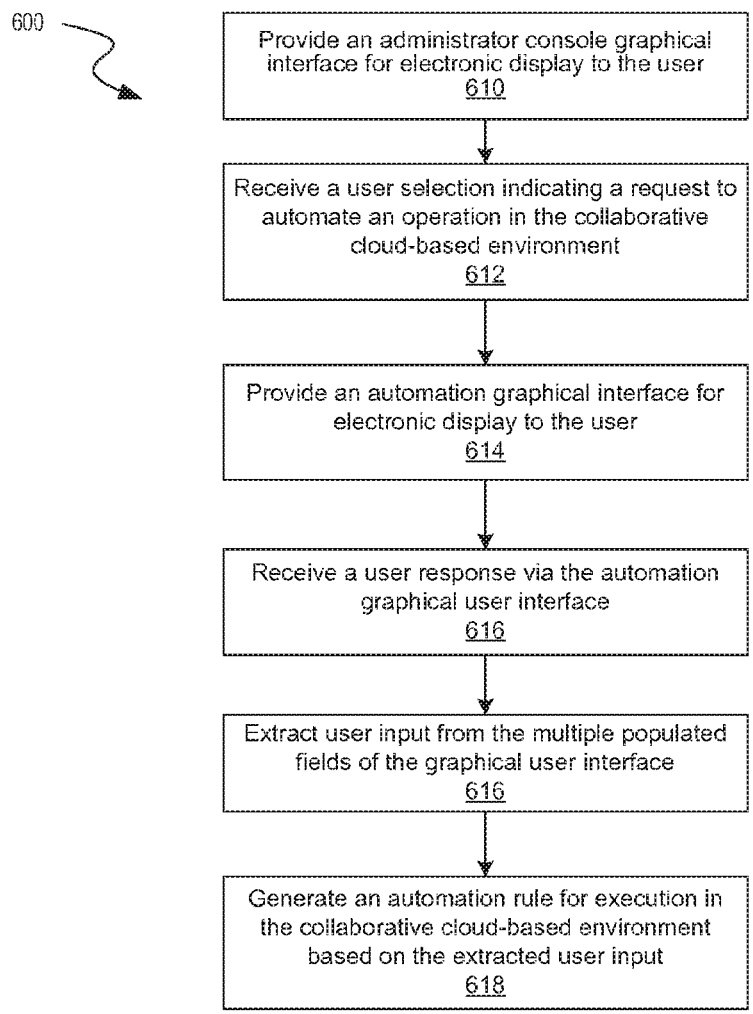
FIG. 6 depicts a data flow diagram illustrating an example process for configuring event-based automation in a collaborative cloud-based environment, according to an embodiment.

In one embodiment, triggers can occur off of metadata events. For example, metadata can be entered by an administer via a event field or a qualifier field FIG. 6 depicts a data flow diagram illustrating an example process 600 for configuring event-based automation in a collaborative cloud-based environment, according to an embodiment. A rules configuration engine such as, for example, rules configuration engine 410 of FIG. 4, can, among other functions, perform the example process 600. The rules configuration engine may be embodied as hardware and/or software, including combinations and/or variations thereof. In addition, in some embodiments, the rule manager can include instructions, wherein the instructions, when executed by one or more processors, cause the one or more processors to perform one or more processes including the following processes.

To begin, in process 610, the rules configuration engine provides an administrator console graphical interface for electronic display to the user. For example, this might be responsive to a user selection of the admin console button or tab (see FIG. 7). In process 612, the rules configuration engine receives a user selection indicating a request to automate an operation in the collaborative cloud-based environment. For example, this might be responsive to a user selection of a start automation or start policy button.

In process 614, the rules configuration engine provides an automation graphical interface for electronic display to the user. In process 616, the rules configuration engine receive a user response via the automation graphical user interface. In process 618, the user extracts user input from the multiple populated fields of the graphical user interface. Lastly, in process 618, the rules configuration engine generates an automation rule for execution in the collaborative cloud-base environment based on the extracted user input.

Figure 7:
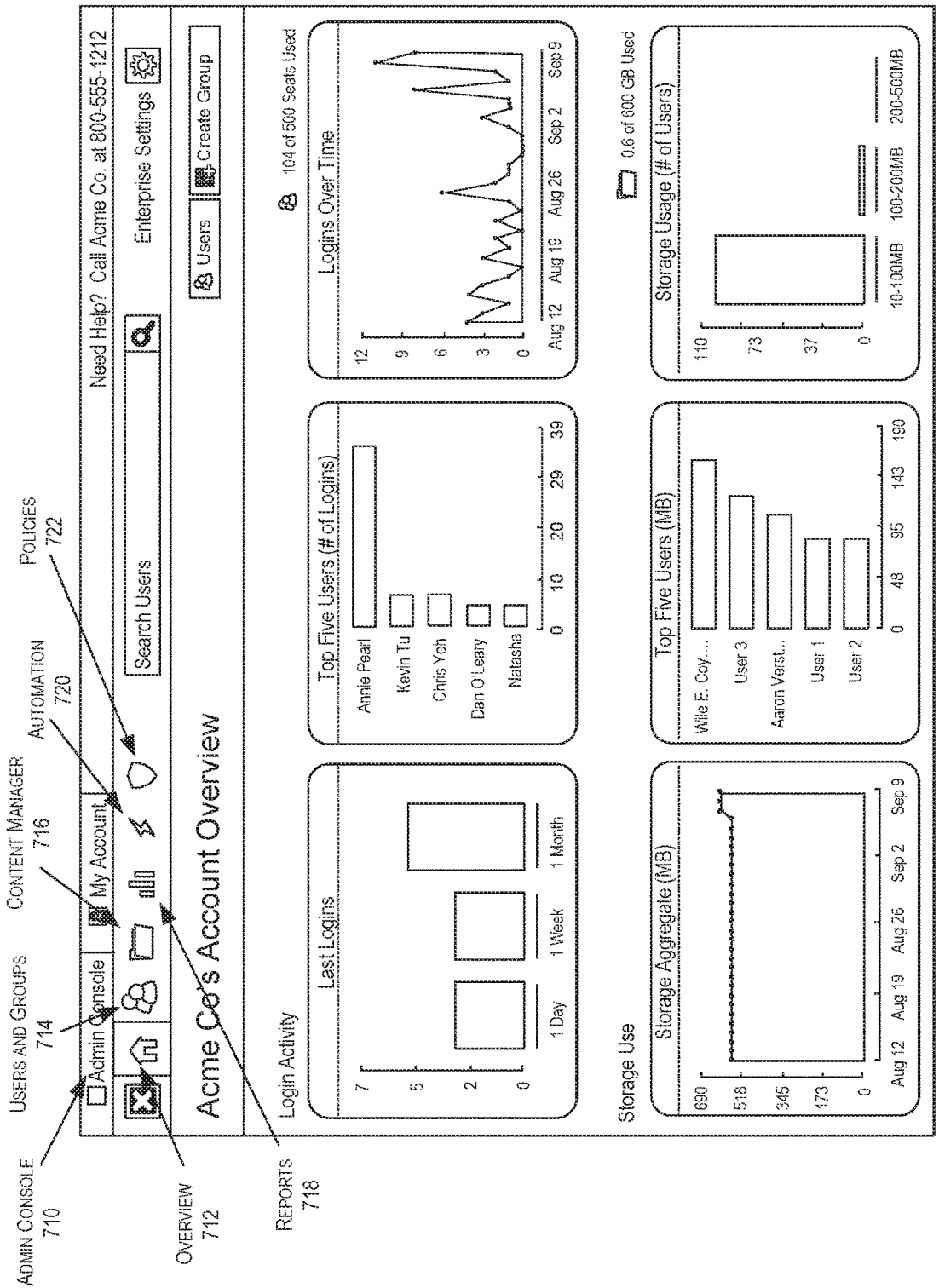
FIG. 7 depicts an example user interface illustrating an administrator console overview view of a graphical user interface for configuration event-based automation in cloud-based collaboration platforms.

FIG. 7 depicts an example user interface illustrating an administrator console overview view of a graphical user interface for configuration event-based automation in cloud-based collaboration platforms.

In one embodiment, an administrator or authorized end-user can access the administrator console graphical user interface by selecting the admin console button or tab 710. The overview view of the graphical user interface is illustrated in the example. Selection of the overview button or tab 712 returns the administrator to this view. Selection of the users and groups button or tab 714 causes the user's system to receive and electronically display a users and groups view. Similarly, the content manager button or tab 716 causes the user's system to receive and electronically display a content manager view (see FIGS. 10A-10B), the reports button or tab 718 causes the user's system to receive and display a reports view, the automation button or tab 720 causes the user's system to receive and display an automation view (see FIGS. 8A-8C), and a policy button or tab 722 causes the user's system to receive and display a policy view (see FIGS. 9A-9D).

Figure 8A:
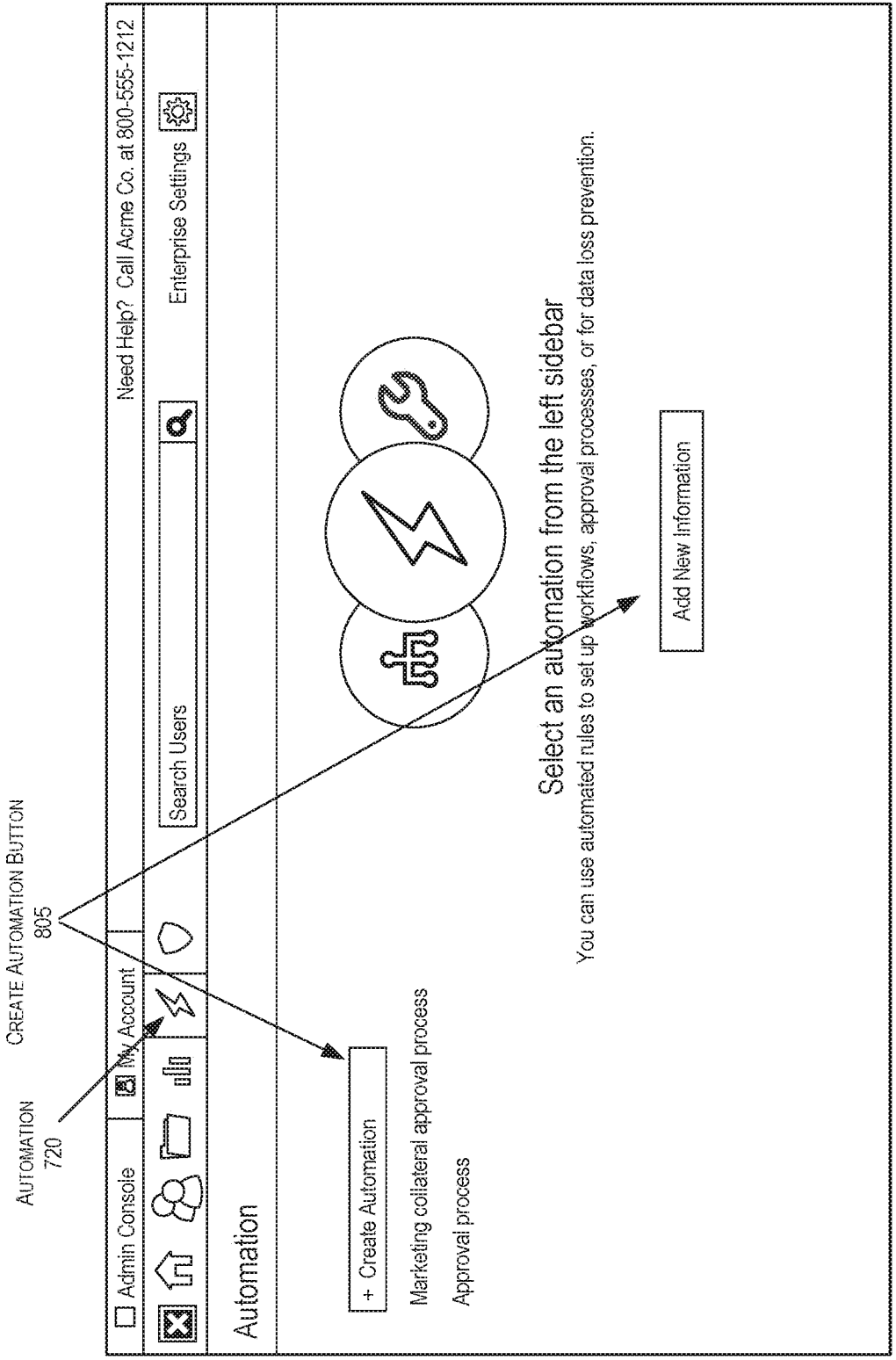
Figure 8B:
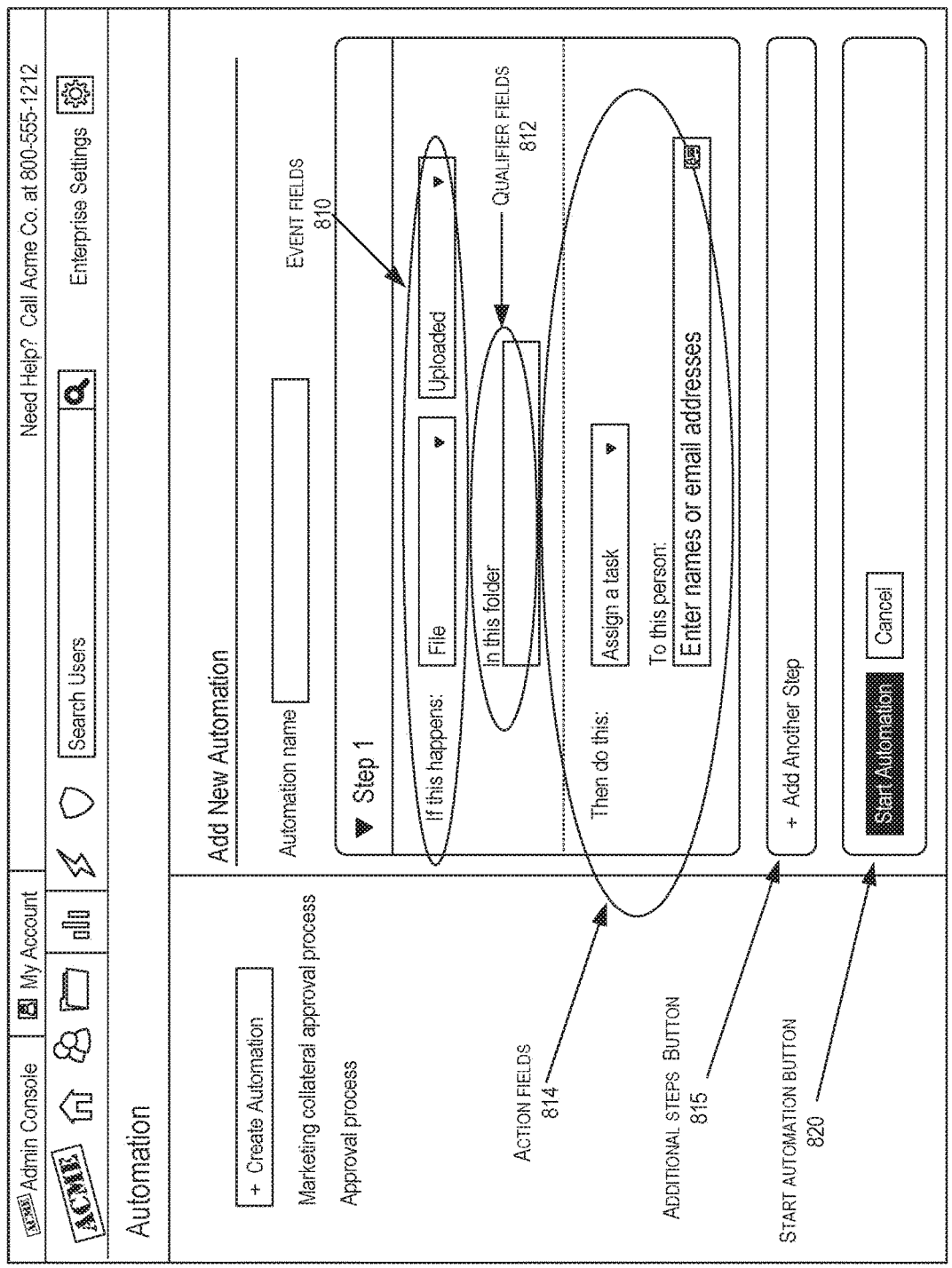

FIGS. 8A-8C depict example user interfaces illustrating an administrator console automation view of a graphical user interface for configuration event-based automation in cloud-based collaboration platforms. The example user interfaces are generally self-explanatory although some description is provided below.

As shown in the example of FIG. 8A, the administrator console automation view of the graphical user interface includes a create automation button 805. An administrator or authorized end-user can select button 805 to add or start a new automation (e.g., workflow automation). FIG. 8B illustrates the administrator console automation view of the graphical user interface for creation of a new automation once the automation button 805 is selected. The example of FIG. 8B shows event fields 810, qualifier fields 812, and action fields 814. Alternatively, the event and qualifier fields can be all considered event fields. In operation, an administrator or authorized user can select an event from the event fields (e.g., file uploaded) and a qualifier (e.g., in folder A). If the event occurs with the qualifier then the selected action occurs (e.g., assign a task to review the document to user #1). Additional steps can also be added by selected the additional steps button 815. An example graphical interface is shown in FIG. 8C of an interface that is electronically displayed when a user selected the additional steps button 815.

FIGS. 9A-9D depict example user interfaces illustrating an administrator console policy view of a graphical user interface for configuration event-based automation in cloud-based collaboration platforms. The example user interfaces are generally self-explanatory although some description is provided below.

Figure 9A:
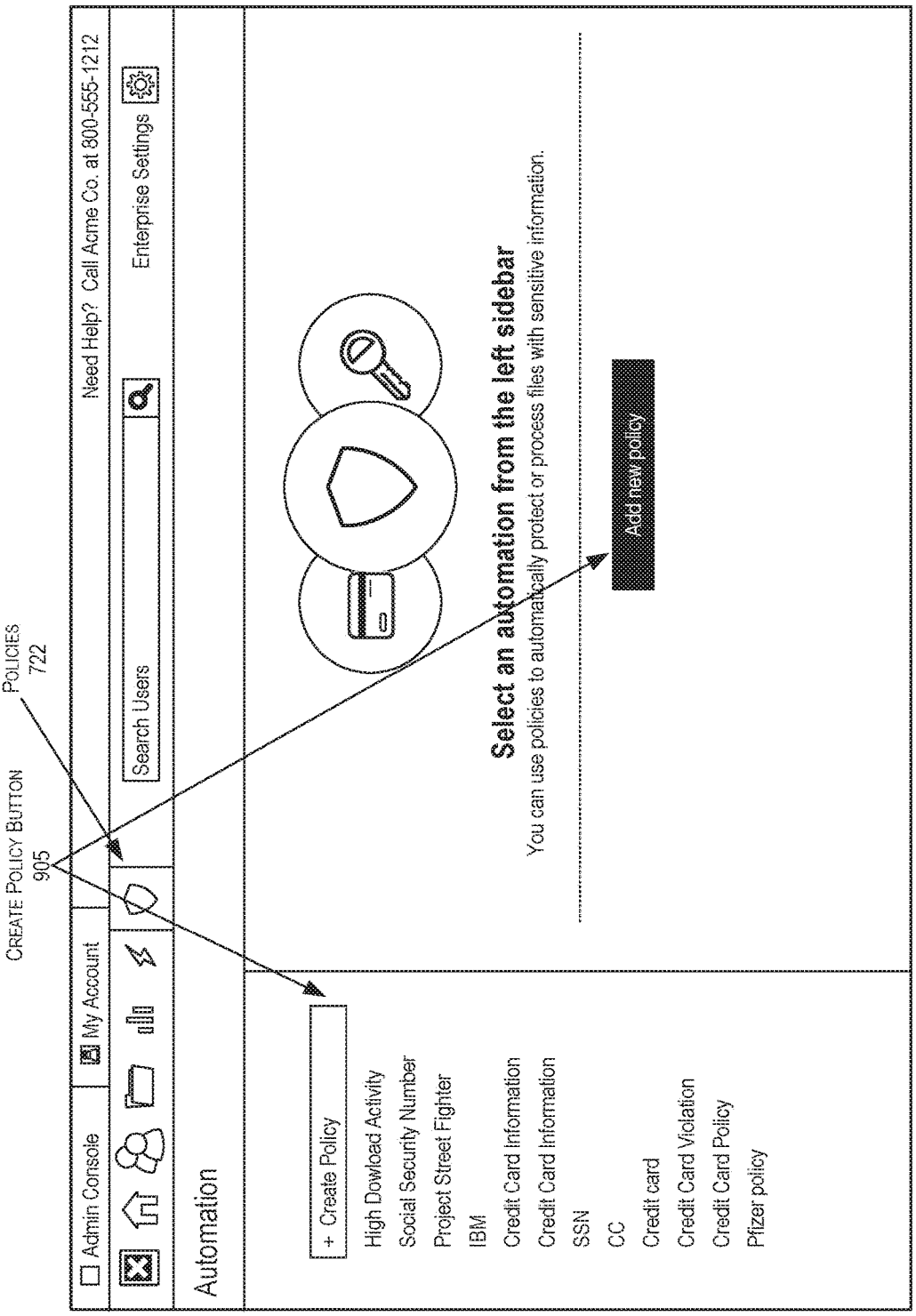

As shown in the example of FIG. 9A, the administrator console automation view of the graphical user interface includes a create automation button 905. An administrator or authorized end-user can select button 905 to add or start a new policy.

Figure 9D:

FIG. 9B illustrates a GUI including event fields 910, qualifier fields 912, and action fields 914. As shown in the examples of FIGS. 9B-9D, changing the selection of an event field 910 can also modify the qualifier and action fields. For example, if an administrator selects "UPLOAD" as shown in FIG. 9B, then the qualifier fields provides a check box input to select what the uploaded document should be searched for (e.g., social security number, credit card number, or other custom words that can be input). The action field 914 provides a checkbox input for the actions to take if the document uploaded contains the selected information.

FIG. 9C illustrates an example whereby "DOWNLOAD" is selected in the event field. In this case, the qualifier fields provide a radio button allowing the administrator to set a threshold on the number of downloads per time (e.g., hour). The action field indicates the actions to take should the threshold downloads be met or exceeded. Selection of notification results in an additional field allowing entry of the user/user to notify. The field can allow email addresses to be entered or selection of the user via searching. Similarly, FIG. 9D illustrates an example whereby "SHARING" is selected in the event field radio button. In this case, the qualifier fields provide a field where the administrator can enter a domain. In one embodiment, special characters, e.g., "*", etc. can be utilized.

Figure 10A:
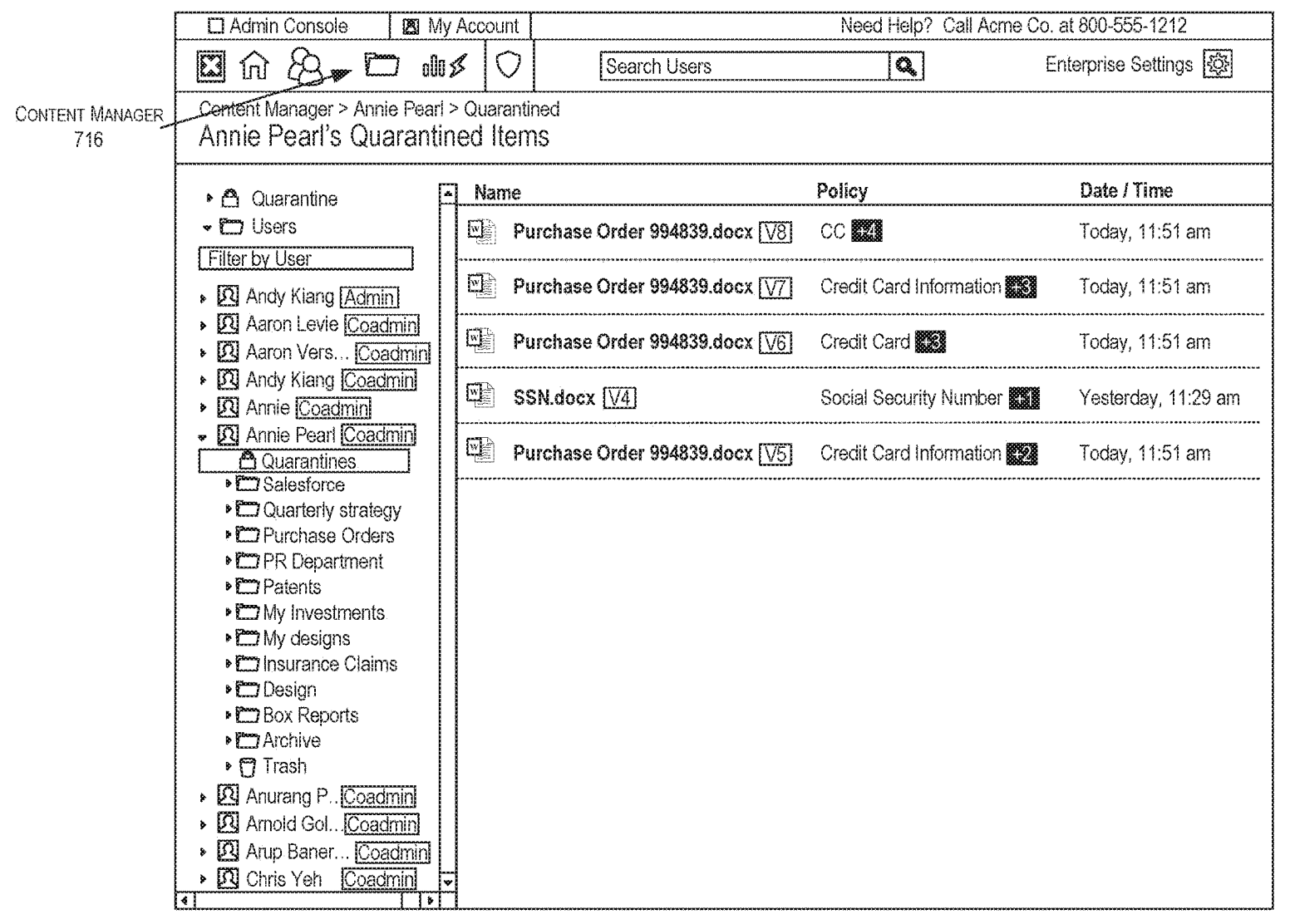
Figure 10B:
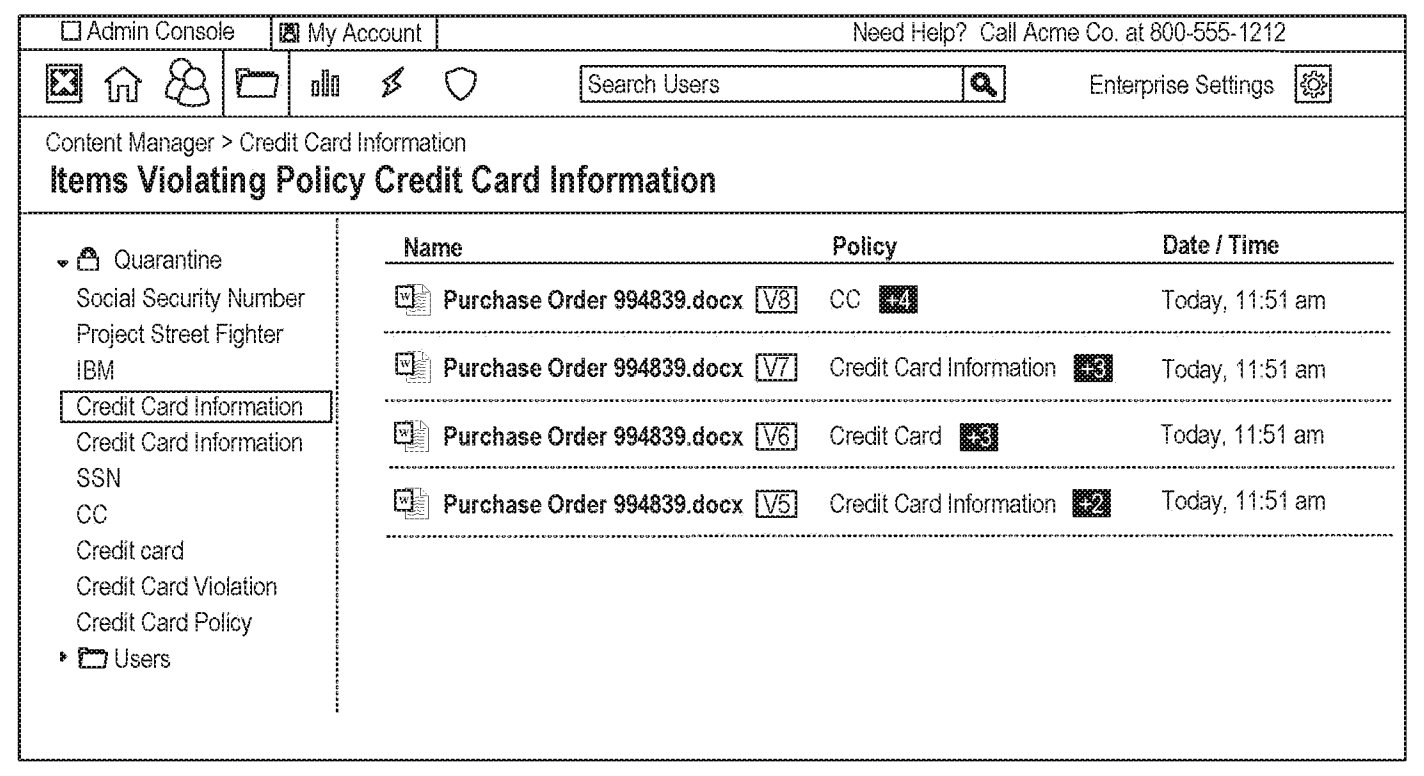

FIGS. 10A-10B depict example user interface illustrating an administrator console content manager view of a graphical user interface for configuration event-based automation in cloud-based collaboration platforms. The example user interfaces are generally self-explanatory although some description is provided below.

As shown in the example of FIG. 10A, selection of the content manger button or tab 716 causes the content manager view of a graphical user interface to be received and electronically displayed on the user's device. An administer can view the policies on each of the user's files by browsing the users top level folder. Similarly, as illustrated in FIG. 10B, the quarantine folder can show all of the files that are quarantined from all users and what policies the file triggered to get quarantines.

Figure 11:
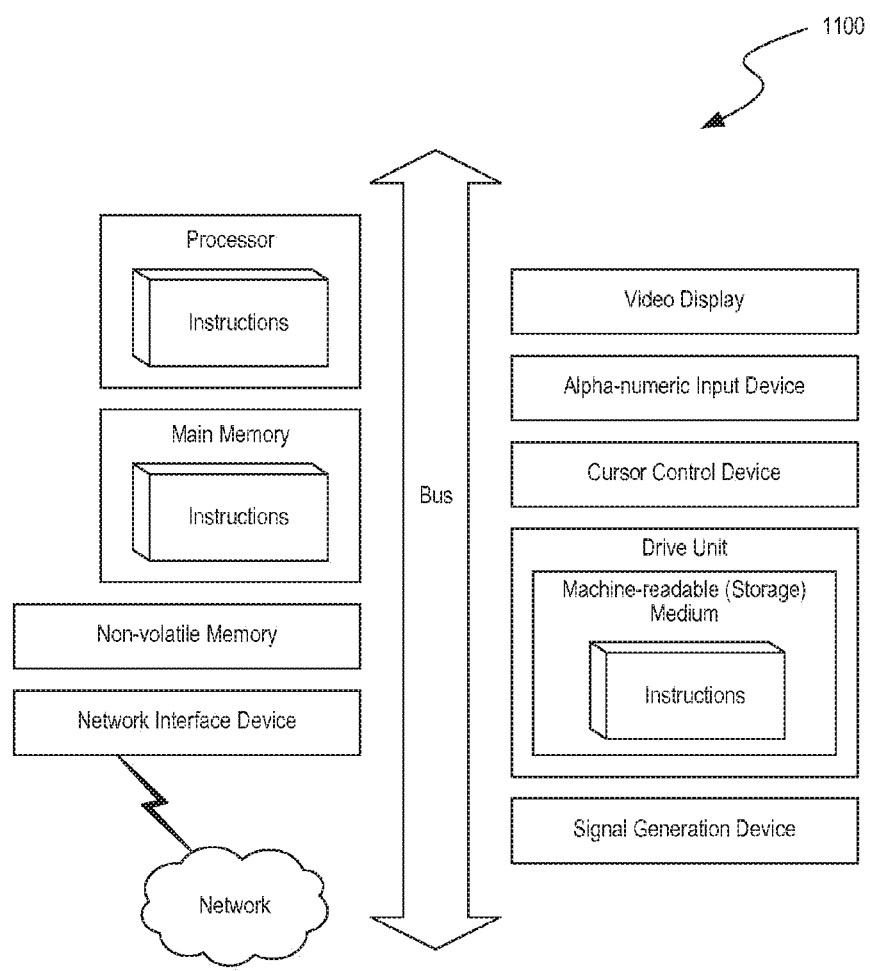
FIG. 11 depicts a diagrammatic representation of a machine in the example form of a computer system within which a set of instructions, for causing the machine to perform any one or more of the methodologies discussed herein, may be executed.

FIG. 11 illustrates a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disks, optical disks (e.g., Compact Disk Read-Only Memory (CD ROMS), Digital Versatile Disks, (DVDs), etc.), among others, and transmission type media such as digital and analog communication links.

The network interface device enables the machine 700 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method of configuring event-based automation in a collaborative cloud-based environment, the method comprising:

receiving, by a server of the collaborative cloud-based environment, a selection indicating a request to automate an operation in the collaborative cloud-based environment, wherein the collaborative cloud-based environment includes a plurality of workspaces, and wherein each of the workspaces is accessible to a plurality of collaborators;

identifying, by the server, an event definition for an event of a plurality of events related to one or more work items in the collaborative cloud-based environment, each event of the plurality of events comprising a different action on a work item by another user, the event definition comprising a qualifying criteria defining criteria of the one or more work items, and an action performed on the work item when a selected event related to a work item has occurred and a selected qualifying criteria of the work item is satisfied;

receiving, by the server, a selection of an event with respect to a work item hosted in a particular workspace of the plurality of workspaces of the collaborative cloud-based environment, wherein the event is related to an activity performed by one or more of the plurality of collaborators with respect to the work item;

updating, by the server, the qualifying criteria and the action performed on the work item in the identified event definition, the updated qualifying criteria and the action performed on the work item comprising an updated event definition for the selected event; and generating, by the server, an automated job to execute the action performed on the work item in the updated event definition based on an identified event criteria of the received event that matches the qualifying criteria of the updated event definition.

2. The method of claim 1, wherein the automation rule comprises a policy.

3. The method of claim 1, wherein the automation rule comprises a workflow automation.

4. The method of claim 1, further comprising receiving, by the server, a selection identifying the work item in the collaborative cloud-based environment.

5. The method of claim 1, wherein the occurrence of the qualifying criteria comprises the qualifying criteria evaluating in the affirmative.

6. The method of claim 1, further comprising triggering execution of the selected action in the collaborative cloud-based environment when the event occurs with the qualifying criteria with respect to the work item.

7. The method of claim 6, further comprising tracking the execution of the action in a log file.

8. The method of claim 1, further comprising:

prior to receiving the selection indicating a request to automate an operation, providing, by the server, an administrator console graphical interface for electronic display to the user, wherein the administrator console graphical interface indicates multiple panel selections.

9. A system comprising:
a processor; and
a memory coupled with and readable by the processor and storing therein a set of instructions which, when executed by the processor, causes the processor to configure event-based automation in a collaborative cloud-based environment by:

receiving a selection indicating a request to automate an operation in the collaborative cloud-based environment, wherein the collaborative cloud-based environment includes a plurality of workspaces, and wherein each of the workspaces is accessible to a plurality of collaborators;

identifying an event definition for an event of a plurality of events related to one or more work items in the collaborative cloud-based environment, each event of the plurality of events comprising a different action on a work item by another user, the event definition comprising a qualifying criteria defining criteria of the one or more work items, and an action performed on the work item when a selected event related to a work item has occurred and a selected qualifying criteria of the work item is satisfied;

receiving a selection of an event with respect to a work item hosted in a particular workspace of the plurality of workspaces of the collaborative cloud-based environment, wherein the event is related to an activity performed by one or more of the plurality of collaborators with respect to the work item;

updating the qualifying criteria and the action performed on the work item in the identified event definition, the updated qualifying criteria and the action performed on the work item comprising an updated event definition for the selected event; and generating an automated job to execute the action performed on the work item in the updated event definition based on an identified event criteria of the received event that matches the qualifying criteria of the updated event definition.

10. The system of claim 9, wherein the instructions further cause the processor to receive a selection identifying the work item in the collaborative cloud-based environment.

11. The system of claim 9, wherein the occurrence of the qualifying criteria comprises the qualifying criteria evaluating in the affirmative.

12. The system of claim 9, wherein the instructions further cause the processor to trigger execution of the selected action in the collaborative cloud-based environment when the event occurs with the qualifying criteria with respect to the work item.

13. The system of claim 12, wherein the instructions further cause the processor to track the execution of the action in a log file.

14. The system of claim 9, wherein the instructions further cause the processor to, prior to receiving the selection indicating a request to automate an operation, provide an administrator console graphical interface for electronic display to the user, wherein the administrator console graphical interface indicates multiple panel selections.

15. A non-transitory, computer-readable medium comprising a set of instructions stored therein which, when executed by a processor, causes the processor to configure event-based automation in a collaborative cloud-based environment by:

receiving a selection indicating a request to automate an operation in the collaborative cloud-based environment, wherein the collaborative cloud-based environment includes a plurality of workspaces, and wherein each of the workspaces is accessible to a plurality of collaborators;

identifying an event definition for an event of a plurality of events related to one or more work items in the collaborative cloud-based environment, each event of the plurality of events comprising a different action on a work item by another user, the event definition comprising a qualifying criteria defining criteria of the one or more work items, and an action performed on the work item when a selected event related to a work item has occurred and a selected qualifying criteria of the work item is satisfied;

receiving a selection of an event with respect to a work item hosted in a particular workspace of the plurality of workspaces of the collaborative cloud-based environment, wherein the event is related to an activity performed by one or more of the plurality of collaborators with respect to the work item;

updating the qualifying criteria and the action performed on the work item in the identified event definition, the updated qualifying criteria and the action performed on the work item comprising an updated event definition for the selected event; and generating an automated job to execute the action performed on the work item in the updated event definition based on an identified event criteria of the received event that matches the qualifying criteria of the updated event definition.

16. The non-transitory, computer-readable medium of claim 15, wherein the instructions further cause the processor to receive a selection identifying the work item in the collaborative cloud-based environment.

17. The non-transitory, computer-readable medium of claim 15, wherein the occurrence of the qualifying criteria comprises the qualifying criteria evaluating in the affirmative.

18. The non-transitory, computer-readable medium of claim 15, wherein the instructions further cause the processor to trigger execution of the selected action in the collaborative cloud-based environment when the event occurs with the qualifying criteria with respect to the work item.

19. The non-transitory, computer-readable medium of claim 18, wherein the instructions further cause the processor to track the execution of the action in a log file.

20. The non-transitory, computer-readable medium of claim 15, wherein the instructions further cause the processor to, prior to receiving the selection indicating a request to automate an operation, provide an administrator console graphical interface for electronic display to the user, wherein the administrator console graphical interface indicates multiple panel selections.

* * * * *